United States Patent
Yao (10) Patent No.: US 11,091,120 B2
(45) Date of Patent: Aug. 17, 2021

(54) VEHICLE SEATBELT ARRANGEMENT

(71) Applicant: Volvo Car Corporation, Gothenburg (SE)

(72) Inventor: Jianfeng Yao, Mölndal (SE)

(73) Assignee: Volvo Car Corporation, Gothenburg (SE)

( * ) Notice: Subject to any disclaimer, the term of this patent is extended or adjusted under 35 U.S.C. 154(b) by 200 days.

(21) Appl. No.: 16/402,283

(22) Filed: May 3, 2019

(65) Prior Publication Data

US 2019/0351868 A1    Nov. 21, 2019

(30) Foreign Application Priority Data

May 16, 2018 (EP) .................................. 18172536

(51) Int. Cl.
| | | |
|---|---|---|
| *B60R 22/26* | (2006.01) | |
| *B60R 22/18* | (2006.01) | |
| *B60R 22/48* | (2006.01) | |
| *B60R 22/24* | (2006.01) | |
| *B60R 22/20* | (2006.01) | |
| *B60R 22/02* | (2006.01) | |

(52) U.S. Cl.
CPC .............. *B60R 22/24* (2013.01); *B60R 22/20* (2013.01); *B60R 22/26* (2013.01); *B60R 22/48* (2013.01); *B60R 2022/027* (2013.01); *B60R 2022/028* (2013.01); *B60R 2022/1818* (2013.01); *B60R 2022/4816* (2013.01); *B60R 2022/4866* (2013.01)

(58) Field of Classification Search
CPC ................ B60R 22/023; B60R 22/024; B60R 2022/027; B60R 2022/028; B60R 2022/1818; B60R 22/26; B60R 22/1806; B60R 22/195; B60R 22/46; B60R 22/48; B60R 22/321; B60R 22/322; B60R 21/01554; B60R 2028/4866
USPC ....................................... 340/457.1
See application file for complete search history.

(56) References Cited

U.S. PATENT DOCUMENTS

| | | | | |
|---|---|---|---|---|
| 3,471,197 A | * | 10/1969 | Ely .......................... | B60N 2/809 111/101 |
| 5,121,527 A | * | 6/1992 | Righi ..................... | B60R 22/324 24/602 |

(Continued)

FOREIGN PATENT DOCUMENTS

| | | | | |
|---|---|---|---|---|
| DE | 29722036 U1 | * | 2/1998 | ........... B60R 22/024 |
| DE | 29722036 U1 | | 2/1998 | |

(Continued)

OTHER PUBLICATIONS

Machine language translation of DE 10229369 A1, obtained from espacenet.com on Jan. 13, 2021.*

(Continued)

*Primary Examiner* — Ruth Ilan
(74) *Attorney, Agent, or Firm* — Clements Bernard Walker; Christopher L. Bernard (57) ABSTRACT

The present disclosure relates to a seatbelt arrangement for a vehicle which comprises a seatbelt and a plurality of connection points, wherein a fourth connecting point is placed at a first lateral side of a vehicle seat and at an upper portion of a backrest. The disclosure also relates to a vehicle comprising a seatbelt arrangement and also to corresponding methods.

15 Claims, 5 Drawing Sheets

(56) References Cited

U.S. PATENT DOCUMENTS

| | | | | |
|---|---|---|---|---|
| 5,358,310 | A * | 10/1994 | Nemoto | B60R 22/023 297/473 |
| 7,520,532 | B2 * | 4/2009 | Bell | B60N 2/688 280/801.1 |
| 7,644,952 | B2 * | 1/2010 | Holtz | B60R 22/1951 280/801.1 |
| 7,971,908 | B2 * | 7/2011 | Hathaway | B60R 22/26 280/808 |
| 8,479,863 | B2 * | 7/2013 | Adolfsson | B60R 22/02 180/268 |
| 8,818,608 | B2 * | 8/2014 | Cullinane | B60W 50/082 701/23 |
| 9,821,759 | B2 * | 11/2017 | Farooq | B60R 22/24 |
| 10,246,051 | B2 * | 4/2019 | Tegen | B60R 22/4628 |
| 10,421,382 | B2 * | 9/2019 | Zheng | B60N 2/20 |
| 10,814,816 | B2 * | 10/2020 | Nagasawa | B60R 21/013 |
| 2004/0061323 | A1 | 4/2004 | Xu | |
| 2006/0157967 | A1 * | 7/2006 | Edwards | B60N 2/688 280/801.1 |
| 2006/0226694 | A1 * | 10/2006 | Higuchi | B60R 22/4604 297/480 |
| 2013/0300555 | A1 * | 11/2013 | Sickon | B60R 22/48 340/457.1 |
| 2015/0343931 | A1 * | 12/2015 | Koike | B60N 2/688 297/468 |
| 2017/0291572 | A1 * | 10/2017 | Burczyk | B60R 22/195 |

FOREIGN PATENT DOCUMENTS

| | | | | |
|---|---|---|---|---|
| DE | 10229369 A1 * | 1/2003 | | B60N 2/06 |
| JP | 2012218659 A * | 11/2012 | | |
| JP | 2012218659 A | 11/2012 | | |

OTHER PUBLICATIONS

Aug. 29, 2018 European Search Report issue on International Application No. EP18172536.

* cited by examiner

VEHICLE SEATBELT ARRANGEMENT

CROSS-REFERENCE TO RELATED APPLICATION

The present disclosure claims the benefit of priority of co-pending European Patent Application No. 18172536.7, filed on May 16, 2018, and entitled "VEHICLE SEATBELT ARRANGEMENT," the contents of which are incorporated in full by reference herein for all purposes.

TECHNICAL FIELD

The present disclosure relates to a seatbelt arrangement for a vehicle, to corresponding methods and to a vehicle comprising such a seatbelt arrangement.

BACKGROUND

Seatbelts have for many years been used in passenger cars and also in other vehicles, such as trucks, buses etc. One of the more frequently used seatbelt types is the so called three-point seatbelt. The three-point seatbelt is normally connected to the vehicle at three different points and has been shown to protect passengers in a safe manner.

In the prior art it has been proposed to add additional connection points to the three-point seatbelt. One example may be found in US 2006/0157967 A1 which discloses making use of a shoulder harness restraint. The additional restraint may be used to keep the seatbelt functional also when a vehicle seat is inclined.

SUMMARY

In view of the above, an object of the present invention is to provide an improved seatbelt arrangement for a vehicle which alleviates at least one of the drawbacks of the prior art, or to provide a suitable alternative.

The above object is provided by the subject matter as specified in the independent claims. Preferred and advantageous embodiments may be found in the dependent claims and in the accompanying description and drawings.

According to a first aspect, the object is provided by a seatbelt arrangement for a vehicle, which comprises a seatbelt and a plurality of connecting points arranged to connect the seatbelt to the vehicle. A first connecting point is adapted to be placed at a position being at a first lateral side of a vehicle seat and proximate a seat portion of the vehicle seat, a second connecting point is adapted to be placed proximate the seat portion at an opposite lateral side of the vehicle seat in respect of the first lateral side and a third connecting point is adapted to be placed at the first lateral side at a position above the first connecting point such that when the seatbelt is being used by a user of the vehicle seat, the seatbelt will extend transversely over a backrest of the vehicle seat from the third connecting point to the second connecting point, and from the second connecting point to the first connecting point over the seat portion. The seatbelt is releasably connectable to the vehicle at the second connecting point, wherein the seatbelt arrangement further comprises a fourth connecting point for the seatbelt, wherein the fourth connecting point is adapted to be placed at the first lateral side of the vehicle seat and at an upper portion of the backrest. The fourth connecting point comprises a first buckle tongue being slidably connected to the seatbelt and a first buckle to be connected to the upper portion of the backrest, wherein the first buckle tongue is releasably connectable to the first buckle. Optionally, the first buckle tongue may be directly slidably connected to the seatbelt. Being directly slidably connected to the seatbelt means herein that there is no additional member, such as a strap or the like, between the first buckle tongue and the seatbelt. Rather, the first buckle tongue is directly connected to the seatbelt via e.g. an opening in the first buckle tongue which the seatbelt extends through. Hence, an efficient and robust connection is provided, which also results in that the seatbelt may be located close to a shoulder of a user of the vehicle seat, also when the backrest is in an inclined position.

By the provision of the present invention, an improved seatbelt arrangement is provided. It has been found that it is advantageous to provide a fourth connecting point for the three-point seatbelt at a position proximate a shoulder of the user of the vehicle seat and which connection point is configured as a buckle tongue and buckle connection. More particularly, it has been found advantageous to make use of a connection at the fourth connection point which comprises a buckle tongue and buckle. A buckle tongue is well known for the skilled person and may be defined as a device comprising a base portion which is slidably connectable to a seatbelt, wherein a tongue protrudes from the base portion. The tongue is further configured for being received in a corresponding buckle, wherein the buckle tongue is releasably connectable to the buckle. The buckle tongue is preferably released from the buckle by pushing on a button on the buckle. Moreover, the first buckle is preferably directly connected to the vehicle seat at the fourth connecting point without any intermediate members, such as straps/additional belts or the like. By using a buckle tongue/buckle configuration at the fourth connecting point, it may be more likely that a user connects the seatbelt at this connection point when the backrest of the vehicle seat is inclined. Hence, by the provision of the present invention, increased safety may be provided in respect of prior art designs where other connections have been used.

Optionally, the seatbelt arrangement may further comprise a first detection means for detecting whether the first buckle tongue is connected to the first buckle at the fourth connecting point. Thereby, further improved safety may be provided. Still optionally, the seatbelt arrangement may further comprise a second detection means for detecting a parameter being indicative of an inclination angle of the backrest. Thereby, further improved safety may be provided by using the parameter for knowing when the seatbelt should be connected at the fourth connecting point.

Optionally, the seatbelt arrangement may further be configured to initiate a warning signal when at least the following conditions are fulfilled:

the vehicle is moving, the first detection means detects that the first buckle tongue is disconnected from the first buckle and the second detection means detects that the inclination angle of the backrest has reached or exceeded a predefined threshold value. Thereby, a warning signal may be initiated to e.g. the user of the vehicle seat to prompt the user to fasten the seatbelt at the fourth connecting point when the backrest has been inclined to a specific threshold value. Thereby, further improved safety may be provided. The predefined threshold value may for example be an inclination angle of the backrest of the vehicle seat which exceeds at least, for example, 10, 20, 30 or 40 degrees in respect of a normal upright inclination angle of the backrest. Purely by way of example, a normal upright inclination angle of the backrest may be 90-110 degrees in respect of the seat portion of the vehicle seat. Moreover, and purely by way of example, the warning signal may be a flashing light, a sound, a tactile response to the user or the like, which may be issued by a display, a loudspeaker etc. in the vehicle. Still optionally, the warning signal may be initiated when also at least one of the following conditions is fulfilled:

the vehicle enters into or is in a semi-autonomous mode and the vehicle enters into or is in a fully-autonomous mode. It has been found that the present invention is especially suitable for vehicles which comprise a semi-autonomous or fully autonomous mode. A semi-autonomous mode may be defined as a mode where at least one of a steering operation and a speed control operation is controlled by the vehicle and not by a user of the vehicle, i.e. a driver. The semi-autonomous mode may in some instances also be regarded as a driver assistance mode where at least parts of steering and/or speed are controlled by the vehicle and the other part is controlled by the user. As can be understood, the expression "controlled by the vehicle" preferably means that a control unit of the vehicle is controlling speed and/or steering, but it may also mean that a remote control unit is controlling steering/speed of the vehicle. Fully autonomous mode may be defined as when both steering and speed control operations are controlled by the vehicle and not by a user of the vehicle.

Optionally, the second connecting point may comprise a second buckle tongue being slidably connected to the seatbelt and a second buckle connected to the vehicle, wherein the second buckle tongue is releasably connectable to the second buckle. Preferably, the second buckle and buckle tongue may be of similar or even identical design as the first buckle and buckle tongue. Thereby, it may be easier for the user to operate the respective buckles and buckle tongues, and also it may provide cost advantages compared to using different types of seatbelt connections.

Optionally, the fourth connecting point may be such that: when the first buckle tongue is connected to the first buckle and when an impact severity to the vehicle in at least one pre-defined direction exceeds, or is expected to exceed, a predefined first threshold value, then the first buckle tongue will be disconnected from the first buckle. Optionally, the first buckle tongue may be disconnected a certain time span after the moment when the first threshold value has been detected. It has been found that in some specific types of impact, and especially in specific impact directions in respect of the vehicle seat, it may provide improved safety if the seatbelt is or becomes disconnected at the fourth connection point. For example, in a front crash situation, it may be beneficial to restrain the user of the vehicle seat during first 10-20 milliseconds after a crash to quickly decelerate the occupant. After an airbag for the user is deployed, it may be beneficial to disconnect the first buckle tongue at the fourth connecting point to let the airbag and three-point seatbelt reduce the load on the chest of the user. Hence, the predefined first threshold value of the impact severity may be indicative of when the airbag has been deployed or it may be indicative of knowing that the airbag will be deployed after a certain time. On the other hand, in a rear end crash situation, i.e. in a different impact direction, it may be beneficial to restrain the user with the four-point seatbelt arrangement all the time, i.e. not disconnecting the fourth connecting point at any point in time during the crash situation. Impact severity may for example be measured by an accelerometer or the like. Hence, impact severity as used herein may mean a measured, or expected, acceleration/deceleration, or any other measured parameter of the vehicle, which is indicative of a crash/collision of the vehicle. An expected impact severity may be predicted by e.g. the use of a camera, laser, radar etc., which monitors an outside surrounding in respect of the vehicle and may detect external objects which the vehicle may crash into. The expected magnitude of the impact severity may also be estimated by for example using vehicle speed as input, or any other measure that is indicative of expected impact severity.

Optionally, the seatbelt arrangement may further be configured such that: when an impact severity to the vehicle exceeds, or is expected to exceed, a predefined second threshold value, then the first buckle will move in a direction such that a seatbelt tension is increased. More particularly, during a collision with a certain impact severity, it may be desirable to increase the tension in the seatbelt to thereby reduce the movement of the user of the vehicle seat during the collision. For example, this may be the event before, or immediately after, a crash situation, such as 0-10 milliseconds before the crash. Thereby, possible slack in the seatbelt may be taken up and thus better restrain and decelerate the user during an earlier phase. For this purpose, pyro-gas may be used to increase the seatbelt tension, but it may also be possible to use other techniques, such as a reversible electric motor, for increasing the tension. Hence, both reversible and irreversible techniques may be used. The sensor for measuring if an impact severity is expected to exceed the predefined second threshold value may be a camera, CCD (charge-coupled device) or laser which is configured to detect that a crash is about to happen. The expected magnitude of the impact severity can also be estimated by for example using vehicle speed as input. Alternatively, or complementary, the sensor may also be an accelerometer or the like that measures an actual impact severity, i.e. when an impact has happened.

Optionally, the first buckle tongue may comprise a passive locking function for locking the slidable connection to the seatbelt when a force having a predefined force level acts in the seatbelt. It has been found that removing the sliding function of the first buckle tongue when an increased force level is recognized in the seatbelt may improve the safety for the user. More particularly, removing the sliding function during such a situation may better fix the user to the vehicle seat during a collision. For example, the passive locking function may work in the following manner: the belt force on each side of the buckle is different. Thus, a resulting force will pull the seatbelt across the buckle. Normally, the difference of the force level between two sides of the seatbelt may exceed 1 KN. When this is the case, it may activate the locking function and thus prevent the seatbelt from sliding across the buckle. In this case, the predefined force level may be defined as 1 kN, 2 kN, 3 kN, 4 kN, 5 kN etc. After locking is activated by the passive locking function, the seatbelt is not allowed to slip across the buckle, and thus the upper body of the user of the vehicle seat may be better constrained.

Preferably, the vehicle seat is a driver seat or a front seat of the vehicle, but may also be any other seat in the vehicle.

According to a second aspect, the object is provided by a method for initiating a warning signal in a vehicle comprising the seatbelt arrangement according to embodiments of the first aspect, wherein the method comprises the following steps:

detecting by the first detection means when the first buckle tongue is disconnected from the first buckle;

detecting by the second detection means when the inclination angle of the backrest has reached or exceeded a predefined threshold value;

detecting when the vehicle is moving; and initiating the warning signal when at least the above is detected.

By the provision of the aforementioned method, an improved method is provided which increases the safety for a user of the vehicle seat. More particularly, by detecting when the vehicle seat is in an inclined position, when the first buckle is disconnected and when the vehicle is moving, a warning signal may be initiated, preferably directly meant for the user, whereof the user will be reminded to connect the first buckle tongue, thereby improving safety. This may be especially advantageous when the vehicle comprises a semi-autonomous or a fully autonomous functionality. Hence, the method may optionally detect when the vehicle enters into, or is in one of, a semi-autonomous or fully-autonomous mode, and thereafter initiate the warning signal when at least also this is detected. As previously mentioned, the warning signal may be a flashing light, a sound, a tactile response or the like.

According to a third aspect, the object is provided by a method for disconnecting the first buckle tongue from the first buckle in a vehicle comprising the seatbelt arrangement according to embodiments of the first aspect, wherein the method comprises the following steps:

detecting when the first buckle tongue is connected to the first buckle and when an impact severity to the vehicle in at least one pre-defined direction exceeds, or is expected to exceed, a predefined first threshold value, and when the above conditions are fulfilled:

disconnecting the first buckle tongue from the first buckle. As already mentioned, it may be advantageous to disconnect the first buckle tongue during certain types of collisions at a certain point in time during the collision.

According to a fourth aspect, the object is provided by a method for increasing a seatbelt tension in a vehicle comprising the seatbelt arrangement according to embodiments of the first aspect, wherein the method comprises the following steps:

detecting when an impact severity to the vehicle exceeds, or is expected to exceed, a predefined second threshold value, and when the above condition is fulfilled:

moving the first buckle in a direction such that a seatbelt tension is increased. As already mentioned, it may also be advantageous to increase the tension in the seatbelt under certain conditions.

According to a fifth aspect, the object is provided by a method for locking a slidable connection of a seatbelt in a vehicle comprising the seatbelt arrangement according to embodiments of the first aspect, wherein the method comprises the following steps:

detecting when a force having a predefined force level acts on the seatbelt, and when it is detected:

locking the slidable connection to the seatbelt of the first buckle tongue by a passive locking function in the first buckle tongue.

According to a sixth aspect, the object is provided by a vehicle comprising the seatbelt arrangement according to any one of the embodiments of the first aspect of the invention. Preferably, the vehicle is a passenger car or a passenger road car, but it may also be other types of vehicles, such as light-weight trucks, heavy-weight trucks, buses etc. Still preferably, the vehicle is a semi-autonomous or a fully autonomous vehicle. Hence, the vehicle may comprise a semi-autonomous mode or a fully autonomous mode as disclosed herein.

BRIEF DESCRIPTION OF DRAWINGS

Exemplifying and preferred embodiments of the present invention will now be described more in detail, by way of example only, with reference to the accompanying drawings, wherein.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DESCRIPTION OF EMBODIMENTS

Figure 1:
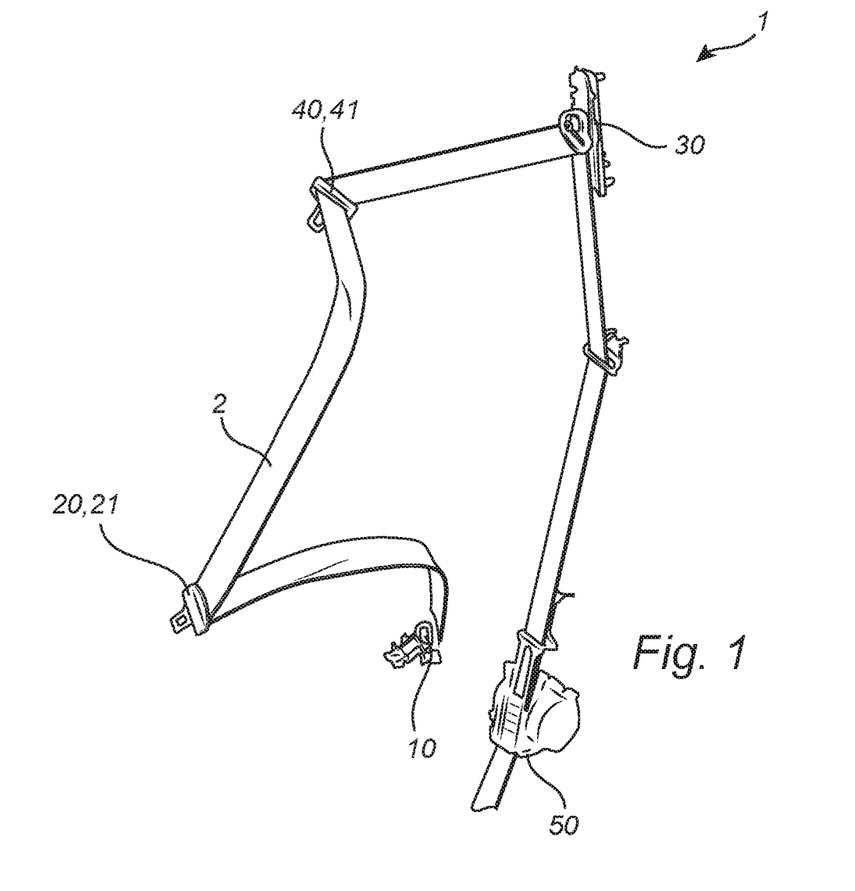
FIG. 1 shows a seatbelt arrangement according to an example embodiment of the present invention.
Figure 3:
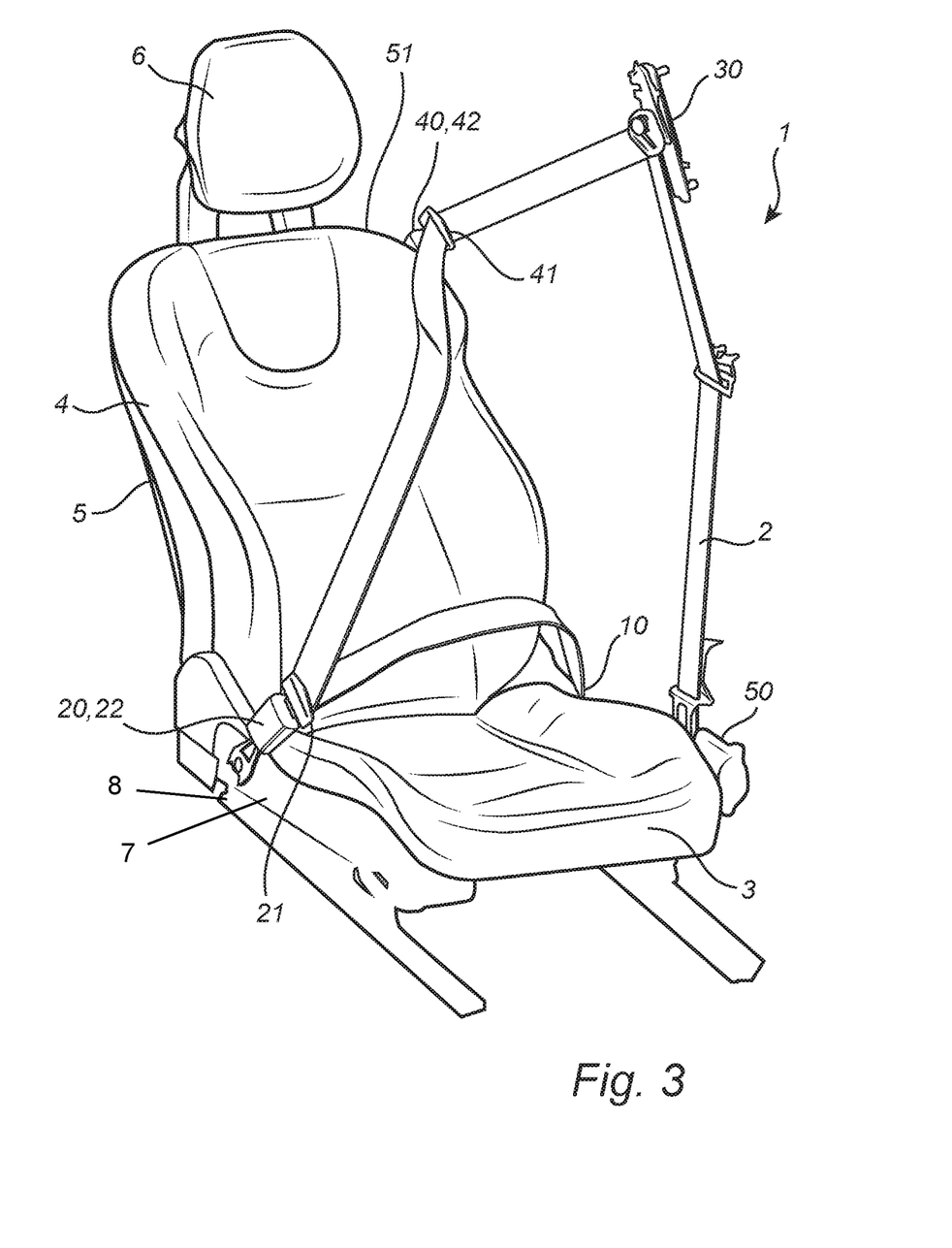
FIG. 3 shows a seatbelt arrangement and a vehicle seat according to an example embodiment of the present invention.
Figure 4:
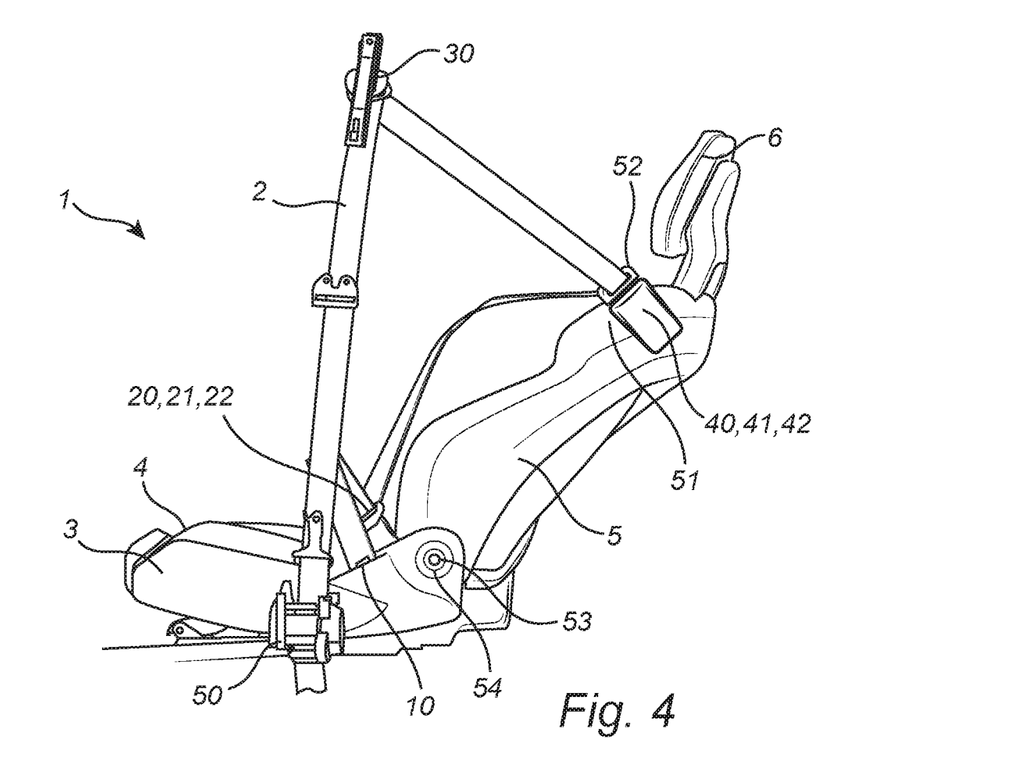
FIG. 4 shows the seatbelt arrangement and the vehicle seat from FIG. 3 when the vehicle seat is in an inclined position.

With reference to especially FIGS. 1, 3 and 4, seatbelt arrangements 1 according to example embodiments of the present invention are depicted. In FIG. 1, a general seatbelt arrangement 1 according to an example embodiment is shown, whilst in FIGS. 3 and 4, examples of preferred embodiments of seatbelt arrangements 1 are depicted, where also a vehicle seat 4 is illustrated. The arrangement 1 comprises a seatbelt 2 and a plurality of connecting points 10, 20, 30, 40 and 50 arranged to connect the seatbelt 2 to the vehicle 100. The first connecting point 10 is placed at a position being at a first lateral side of a vehicle seat 4 and proximate a seat portion 3, the second connecting point 20 is placed proximate the seat portion 3 and at an opposite lateral side of the vehicle seat 4 in respect of the first lateral side, and the third connecting point 30 is placed at the first lateral side at a position above the first connecting point 10 such that when the seatbelt 2 is being used by a user of the vehicle seat 4, the seatbelt 2 will extend transversely over a backrest 5 of the vehicle seat 4 from the third connecting point 30 to the second connecting point 20, and from the second connecting point 20 to the first connecting point 10 over the seat portion 3. The seatbelt 2 is releasably connectable to the vehicle 100 at the second connecting point 20, for example via the seat frame 7 and the runners 8, and the seatbelt arrangement 1 further comprises a fourth connecting point 40 for the seatbelt 2. The fourth connecting point 40 is placed at the first lateral side of the vehicle seat 4 and at an upper portion 51 of the backrest 5. Moreover, the fourth connecting point 40 comprises a first buckle tongue 41 being slidably connected to the seatbelt 2 and a first buckle 42 connected to the upper portion 51 of the backrest 5, wherein said first buckle tongue 41 is releasably connectable to the first buckle 42. Hence, the seatbelt arrangement 1 may be regarded as a three-point seatbelt when the fourth connecting point is disconnected and a four-point seatbelt when the first buckle tongue 41 is connected to the first buckle 42. In the embodiments shown in FIGS. 1, 3 and 4, the second connection point 20 comprises a second buckle tongue 21 and a second buckle 22. Moreover, the seatbelt 2 may preferably be slidably connected at the connection point 30. The seatbelt arrangement 1 may also comprise a reel for the seatbelt 2 at the connection point 50, where the seatbelt 2 is connected to the vehicle 100.

Figure 2:
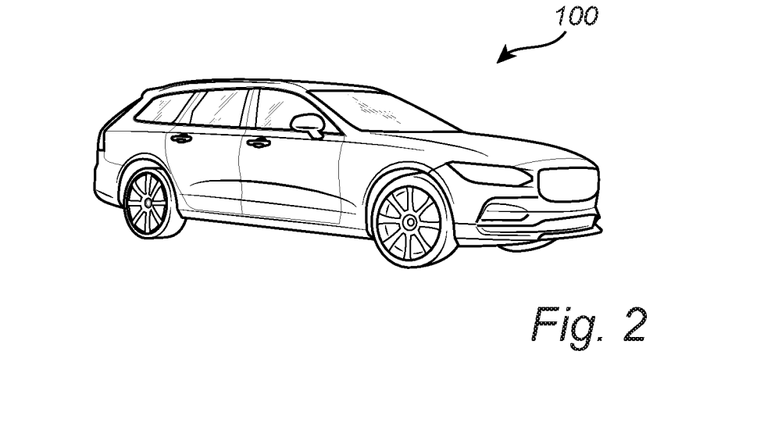
FIG. 2 shows a vehicle according to an example embodiment of the present invention.

FIG. 2 shows an example embodiment of a vehicle 100 comprising a seatbelt arrangement 1 according to the first aspect of the invention. It has been found that the seatbelt arrangement 1 is especially useful when the vehicle 100 is an autonomous vehicle or a semi-autonomous vehicle. More particularly, when the vehicle 100 enters into or is in an autonomous mode, a user of the vehicle 100 may want to lean back and recline the backrest 5 to thereby attain a more comfortable position. In such case, the fourth connecting point 40 may be used for connecting the seatbelt 2 to the vehicle seat 4. Thereby, the seatbelt 2 will be closer to, and better follow, the profile of the user. Hence, providing a seatbelt arrangement 1 as disclosed herein for an autonomous or a semi-autonomous vehicle 100 may provide increased safety for the user during the autonomous mode. The vehicle 100 in FIG. 2 is a passenger road car and it may be propelled by an internal combustion engine and/or an electrical motor.

In FIG. 3 it can be seen that the fourth connecting point 40 is placed at an upper portion 51 of the backrest 5 proximate a headrest 6 of the vehicle seat 4. In a preferred embodiment, the fourth connecting point 40 is placed at a position such that it will be close to a user's shoulder (not shown). By the provision of the present invention, improved safety may be provided to the user of the vehicle seat 4, and especially it has been found that the present arrangement 1 is suitable for vehicles comprising semi-autonomous or fully autonomous modes. In FIG. 4, it can be seen that the backrest 5 has been reclined such that the user may adopt a more comfortable position compared to when the backrest 5 is in a more upright position. In the illustrated embodiment, the arrangement 1 further comprises a first detection means 52 for detecting whether the first buckle tongue 41 is connected to the first buckle 42 or not. The first detection means 52 may be any kind of sensor or the like, and may preferably be a similar detection means as already known for buckle tongue/buckle connections of conventional three-point seatbelts. Hence, the details of the detection means 52 will not be further elaborated on herein. Moreover, the arrangement 1 further comprises a second detection means 53 for detecting a parameter being indicative of an inclination angle of the backrest 5. Here, in FIG. 4, it can be seen that the second detection means 53 is positioned at a pivot axle 54 around which the backrest 5 pivots. The pivot axle 54 extends from the first lateral side to the second lateral side of the vehicle seat 4. The second detection means 53 may be an angle sensor that measures the angle of the backrest 5, for example with respect to the seat portion 3. However, it may also be any other kind of sensor that measures a value which is indicative of the angle, and the second detection means 53 may therefore also be positioned in other locations than at the pivot axle 54. An angle sensor located at the pivot axle 54 has however been found to be an efficient way of detecting the inclination angle of the backrest 5. By the first and the second detection means 52 and 53, respectively, the user may be notified when there is a need to connect the seatbelt 2 at the fourth connecting point 40. The flowchart in FIG. 7 shows an example of this.

Figure 5:
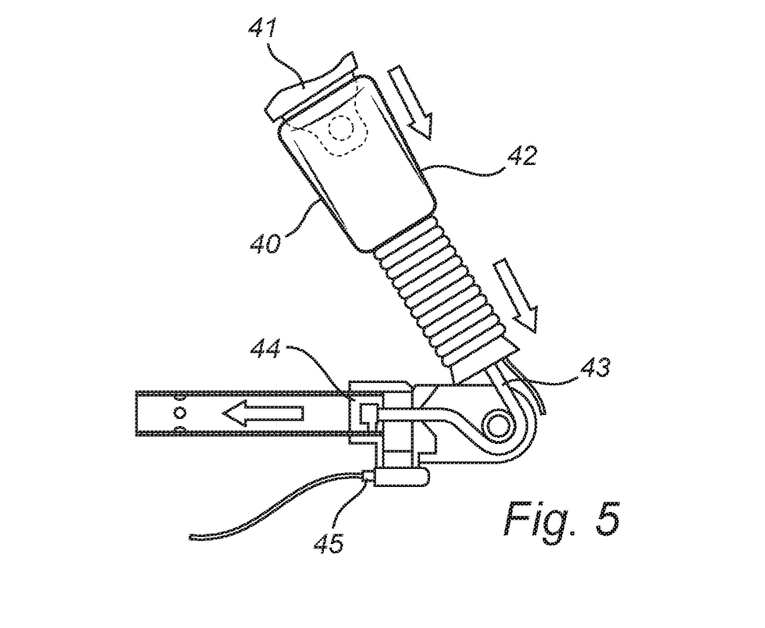
FIG. 5 shows a buckle tongue and buckle configuration according to an example embodiment of the present invention.

In FIG. 5, an example embodiment of the fourth connecting point 40 for the seatbelt 2 is depicted. It comprises a first buckle tongue 41 and a first buckle 42. The first buckle 42 is connected to a seatbelt switch connector 43, here a steel wire, which in turn is connected to a piston 44 which is movable in a direction as indicated by the arrow proximate the piston 44. Moreover, a pyrotechnic gas generator 45 is shown which is configured to generate a rapid movement of the piston 44 when an impact severity, e.g. detected by measuring an acceleration/deceleration, to the vehicle 100 is exceeded or expected to exceed a predefined second threshold value. The acceleration/deceleration to the vehicle 100 may be measured by any kind of accelerometer or the like. Sensors for measuring acceleration are already well known in the art and used for other applications in a vehicle 100, such as for measuring when an airbag is to be deployed. When the piston 44 is moved, the switch connector 43 will follow the movement and thereby pull in the first buckle 42 such that the seatbelt 2 is pre-tensioned and any slack is taken up. The movement is illustrated by the arrow proximate the first buckle 42. Hence, a user in the vehicle seat 4 may be pulled backwards in the direction towards the vehicle seat 4, and may therefore be better fixed thereto during a collision. Purely by way of example, the first buckle 42 may be moved as indicated above before an airbag of the vehicle is deployed. The airbag may for example be an airbag in a steering wheel when the seatbelt arrangement 1 is located at a driver's vehicle seat.

Figure 6:
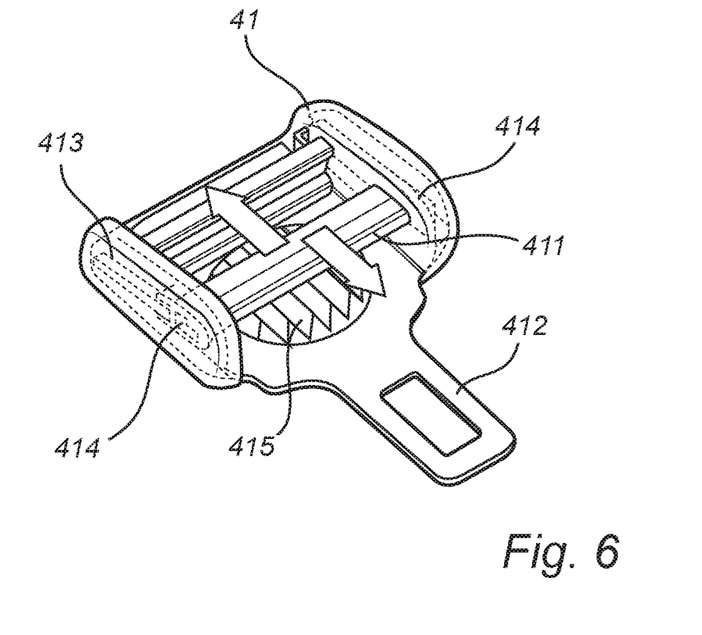
FIG. 6 shows a buckle tongue according to an example embodiment of the present invention.

Now turning to FIG. 6, an example embodiment of a first buckle tongue 41 for the fourth connecting point 40 is depicted. The first buckle tongue 41 comprises a base portion 413 which is slidably connectable to the seatbelt 2. The base portion 413 is preferably mainly made of one of, or a combination of, a polymer and a metal to thereby result in a rigid and robust design. A tongue 412, preferably made in metal, such as steel, is connected to the base portion 413, whereby the seatbelt 2 is arranged to be slidable in-between a movable member 411 and a ridged portion 415 of the first buckle tongue 41. Hence, the movable member 411 and the ridged portion 415 define an opening for the seatbelt 2 in the first buckle tongue 41. The movable member 411 is connected to the base portion 413 by a translational spring connection 414, thereby allowing the movable member 411 to be moved when a force acts on the movable member 411 in one direction, in this example in a direction away from the tongue 412. When the force is removed, the movable member 411 may be moved back by the spring connection 414 to an initial position, i.e. moved back in a direction towards the tongue 412. The movable member 411 together with the spring connection 414 and the ridged portion 415 result in a passive locking function for the seatbelt 2. Hence, when a force with a predefined force level acts in the seatbelt 2, or alternatively when a certain acceleration of the seatbelt 2 is recognized, the passive locking function will lock the seatbelt 2 to the first buckle tongue 41. Thereby, improved safety may be provided for the user of the seatbelt arrangement 1. Optionally, the member 411 could be connected to the base portion 413 by a rotational spring connection 414, thereby allowing the movable member 411 to be rotated when a torque acts on the movable member 411. The movable member 411 may have various cross-section shapes. Optionally, the member 411 could be connected to the base portion 413 by a rotational and translational spring connection 414, thereby allowing the movable member 411 to be moved and rotated when a force and a torque act on the movable member 411.

Figure 7:
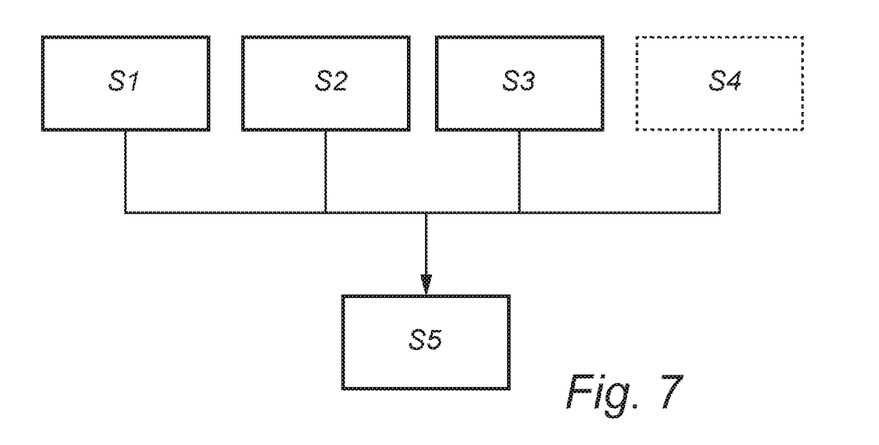
FIG. 7 shows a flowchart of a method according to an example embodiment of the present invention.

In FIG. 7, a flowchart of a method for initiating a warning signal according to an example embodiment of the second aspect of the present invention can be seen. The method is for a vehicle 100 comprising the seatbelt arrangement 1 according to embodiments of the first aspect and comprises the following steps:

S1) detecting by the first detection means 52 when the first buckle tongue 41 is disconnected from the first buckle 42, S2) detecting by the second detection means 53 when the inclination angle of the backrest 5 has reached or exceeded a predefined threshold value, S3) detecting when the vehicle 100 is moving, S4) detecting when the vehicle 100 enters into or is in one of a semi-autonomous mode or a fully autonomous mode, and S5) initiating the warning signal when at least the above, S1-S4, is detected.

Step S4 is optional and its box in the flowchart is thereby shown by dashed lines.

Figure 8:
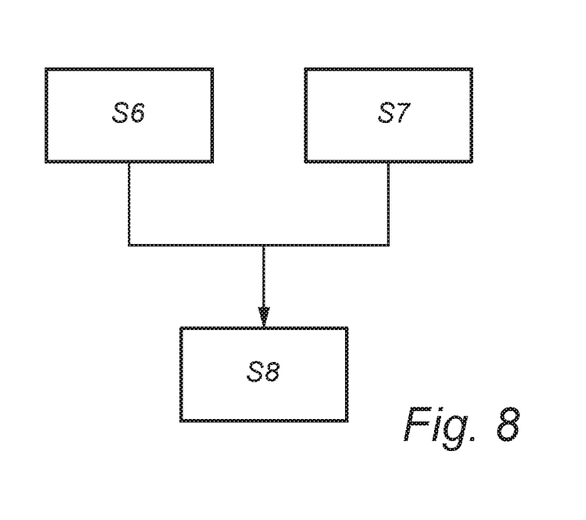
FIG. 8 shows a flowchart of a method according to an example embodiment of the present invention.

In FIG. 8, a flowchart of a method for disconnecting the first buckle tongue 41 according to an example embodiment of the third aspect of the present invention can be seen. The method is for a vehicle 100 comprising a seatbelt arrangement 1 according to embodiments of the first aspect and comprises the following steps:

S6) detecting when the first buckle tongue 41 is connected to the first buckle 42, and S7) when an impact severity to the vehicle 100 in at least one pre-defined direction exceeds, or is expected to exceed, a predefined first threshold value, and when the above conditions S6-S7 are fulfilled:

S8) disconnecting the first buckle tongue 41 from the first buckle 42.

Figure 9:
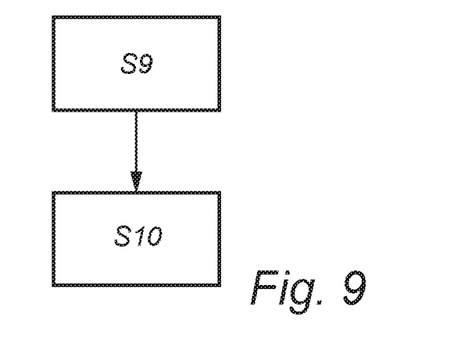
FIG. 9 shows a flowchart of a method according to an example embodiment of the present invention.

In FIG. 9, a flowchart of a method for increasing a seatbelt 2 tension according to an example embodiment of the fourth aspect of the present invention can be seen. The method is for a vehicle 100 comprising a seatbelt arrangement 1 according to embodiments of the first aspect and comprises the following steps:

S9) detecting when an impact severity to the vehicle 100 is exceeding, or is expected to exceed, a predefined second threshold value, and when the above condition S9 is fulfilled:

S10) moving the first buckle 42 in a direction such that a seatbelt 2 tension is increased.

Figure 10:
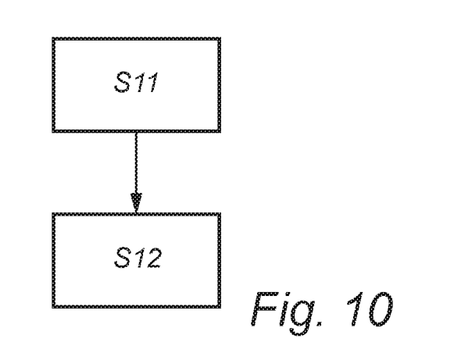
FIG. 10 shows a flowchart of a method according to an example embodiment of the present invention.

In FIG. 10, a flowchart of a method for locking a slidable connection of the seatbelt 2 according to an example embodiment of the fifth aspect of the present invention can be seen. The method is for a vehicle 100 comprising a seatbelt arrangement 1 according to embodiments of the first aspect and comprises the following steps:

S11) detecting when a force having a predefined force level acts on the seatbelt 2, and when it is detected:

S12) locking the slidable connection to the seatbelt 2 of the first buckle tongue 41 by a passive locking function 411, 413, 414 and 415 in the first buckle tongue 41.

The invention is not limited to the embodiments described herein. It will be evident for the skilled person that other embodiments and modifications to the embodiments specified hereinabove are also possible within the scope of the appended claims.

The invention claimed is:

1. A seatbelt arrangement for a vehicle, comprising,
a seatbelt and a plurality of connecting points arranged to connect the seatbelt to the vehicle,
whereby a first connecting point is adapted to be placed at a position being at a first lateral side of a vehicle seat and proximate a seat portion of said vehicle seat, a second connecting point is adapted to be placed proximate the seat portion and at an opposite lateral side of the vehicle seat in respect of the first lateral side and a third connecting point is adapted to be placed at the first lateral side at a position above the first connecting point such that when the seatbelt is being used by a user of the vehicle seat, the seatbelt will extend transversely over a backrest of the vehicle seat from the third connecting point to the second connecting point, and from the second connecting point to the first connecting point over the seat portion,
wherein said seatbelt is releasably connectable to the vehicle at the second connecting point,
wherein said seatbelt arrangement further comprises a fourth connecting point for the seatbelt, wherein said fourth connecting point is adapted to be placed at the first lateral side of the vehicle seat and at an upper portion of the backrest, and
wherein said fourth connecting point comprises a first buckle tongue being slidably connected to the seatbelt and a first buckle to be connected to the upper portion of the backrest, wherein said first buckle tongue is releasably connectable to the first buckle,
a first detection means for detecting whether said first buckle tongue is connected to the first buckle at the fourth connecting point and a second detection means for detecting a parameter being indicative of an inclination angle of the backrest,
wherein said seatbelt arrangement is configured to initiate a warning signal when the following conditions are fulfilled:
the vehicle is moving, the first detection means detects that the first buckle tongue is disconnected from the first buckle and the second detection means detects that the inclination angle of the backrest has reached or exceeded a predefined threshold value.

2. The seatbelt arrangement according to claim 1, wherein said warning signal is initiated when also at least one of the following conditions is fulfilled:
the vehicle enters into or is in a semi-autonomous mode, and
the vehicle enters into or is in a fully-autonomous mode.

3. The seatbelt arrangement according to claim 1, wherein said second connecting point comprises a second buckle tongue being slidably connected to the seatbelt and a second buckle to be connected to the vehicle, wherein the second buckle tongue is releasably connectable to the second buckle.

4. The seatbelt arrangement according to claim 1, wherein said fourth connecting point is such that: when the first buckle tongue is connected to the first buckle and when an impact severity to the vehicle in at least one pre-defined direction exceeds, or is expected to exceed, a predefined first threshold value, then the first buckle tongue will be disconnected from the first buckle.

5. The seatbelt arrangement according to claim 1, wherein the first buckle is such that: when an impact severity to the vehicle exceeds, or is expected to exceed, another predefined threshold value, then the first buckle will move in a direction such that a seatbelt tension is increased.

6. The seatbelt arrangement according to claim 1, wherein the first buckle tongue comprises a passive locking function for locking the slidable connection to the seatbelt when a force having a predefined force level acts on the seatbelt.

7. A method for initiating a warning signal in a vehicle comprising the seatbelt arrangement according to claim 1, said method comprising the following steps:
   detecting by the first detection means when the first buckle tongue is disconnected from the first buckle;
   detecting by the second detection means when the inclination angle of the backrest has reached or exceeded the predefined threshold value;
   detecting when the vehicle is moving; and
   initiating the warning signal when at least the above is detected.

8. The method according to claim 7, further comprising,
   detecting when the vehicle enters into or is in one of a semi-autonomous or fully-autonomous mode; and
   initiating the warning signal when at least the above is detected.

9. A vehicle, comprising:
   a seatbelt arrangement, comprising,
   a seatbelt and a plurality of connecting points arranged to connect the seatbelt to the vehicle,
   whereby a first connecting point is adapted to be placed at a position being at a first lateral side of a vehicle seat and proximate a seat portion of said vehicle seat, a second connecting point is adapted to be placed proximate the seat portion and at an opposite lateral side of the vehicle seat in respect of the first lateral side and a third connecting point is adapted to be placed at the first lateral side at a position above the first connecting point such that when the seatbelt is being used by a user of the vehicle seat, the seatbelt will extend transversely over a backrest of the vehicle seat from the third connecting point to the second connecting point, and from the second connecting point to the first connecting point over the seat portion,
   wherein said seatbelt is releasably connectable to the vehicle at the second connecting point,
   wherein said seatbelt arrangement further comprises a fourth connecting point for the seatbelt, wherein said fourth connecting point is adapted to be placed at the first lateral side of the vehicle seat and at an upper portion of the backrest, and
   wherein said fourth connecting point comprises a first buckle tongue being slidably connected to the seatbelt and a first buckle to be connected to the upper portion of the backrest, wherein said first buckle tongue is releasably connectable to the first buckle,
   a first detection means for detecting whether said first buckle tongue is connected to the first buckle at the fourth connecting point and a second detection means for detecting a parameter being indicative of an inclination angle of the backrest,
   wherein said seatbelt arrangement is configured to initiate a warning signal when the following conditions are fulfilled:
   the vehicle is moving, the first detection means detects that the first buckle tongue is disconnected from the first buckle and the second detection means detects that the inclination angle of the backrest has reached or exceeded a predefined threshold value.

10. The vehicle according to claim 9, wherein said warning signal is initiated when also at least one of the following conditions is fulfilled:
    the vehicle enters into or is in a semi-autonomous mode, and
    the vehicle enters into or is in a fully-autonomous mode.

11. The vehicle according to claim 9, wherein said second connecting point comprises a second buckle tongue being slidably connected to the seatbelt and a second buckle to be connected to the vehicle, wherein the second buckle tongue is releasably connectable to the second buckle.

12. The vehicle according to claim 9, wherein said fourth connecting point is such that: when the first buckle tongue is connected to the first buckle and when an impact severity to the vehicle in at least one pre-defined direction exceeds, or is expected to exceed, a predefined first threshold value, then the first buckle tongue will be disconnected from the first buckle.

13. The vehicle according to claim 9, wherein the first buckle is such that: when an impact severity to the vehicle exceeds, or is expected to exceed, a predefined second threshold value, then the first buckle will move in a direction such that a seatbelt tension is increased.

14. The vehicle according to claim 9, wherein the first buckle tongue comprises a passive locking function for locking the slidable connection to the seatbelt when a force having a predefined force level acts on the seatbelt.

15. The vehicle according to claim 9, wherein said vehicle is a semi-autonomous or a fully autonomous vehicle.

* * * * *